UNITED STATES PATENT OFFICE.

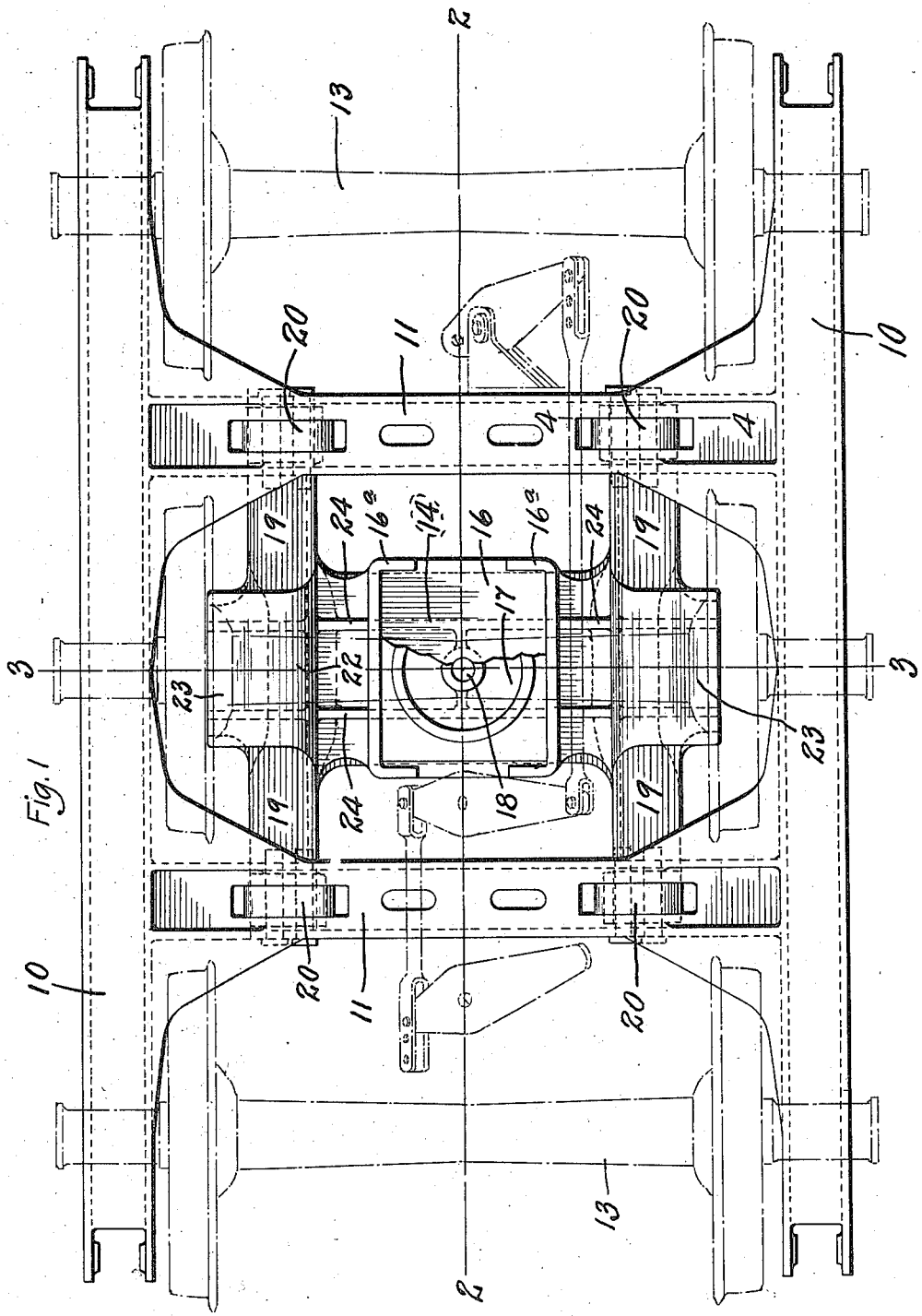

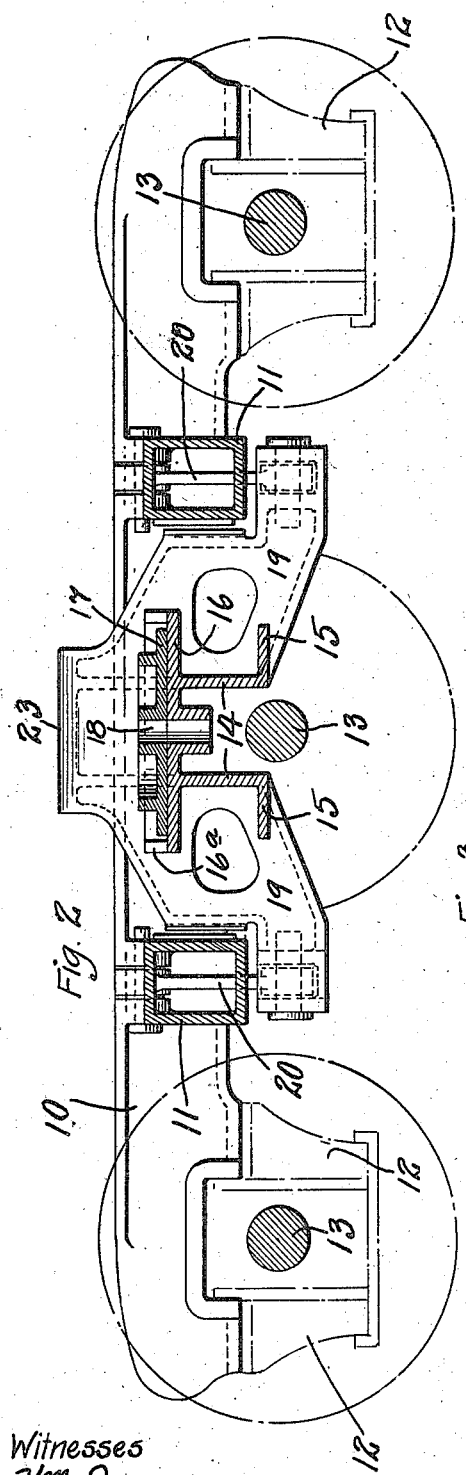

HARRY M. PFLAGER, OF ST. LOUIS, MISSOURI, ASSIGNOR TO DOUBLE BODY BOLSTER COMPANY, OF ST. LOUIS, MISSOURI, A CORPORATION OF NEW JERSEY.

CAR-TRUCK.

1,068,529.  Specification of Letters Patent.  Patented July 29, 1913.

Application filed April 21, 1913. Serial No. 762,550.

*To all whom it may concern:*

Be it known that I, HARRY M. PFLAGER, a citizen of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification, in which—

Figure 1 is a plan view of a six wheel truck of my improved construction. Fig. 2 is a sectional view taken approximately on the line 2—2 of Fig. 1. Fig. 3 is a cross sectional view taken approximately on the line 3—3 of Fig. 1. Fig. 4 is a detail sectional view taken approximately on the line 4—4 of Fig. 1.

My invention relates generally to car trucks, and more particularly to a six wheel truck designed and adapted for use in connection with locomotive tenders, and where only a short wheel base truck can be used.

The principal objects of my invention are, first, to combine with a truck frame a center bolster member which is narrower in width than the truck frame so that it lies wholly between the wheel pieces of the truck frame; second, to provide a truck center bolster having parts adapted to form side bearings or to receive side bearing members, which parts are located inside the wheel pieces of the truck frame; third, to combine with the center bolster a center bearing plate; fourth, to support the center bolster from the truck frame by means of hangers arranged so as to permit the bolster member to swing transversely relative to the truck frame, and fifth to provide a center bolster member, the central portion of which practically straddles the center axle of the truck With the above and other objects in view, my invention consists in certain novel features of construction and arrangement of parts hereinafter more fully described and claimed.

In the construction of my improved truck as illustrated the truck frame, comprising wheel pieces 10 and transoms 11, is shown as being formed integral, preferably by casting, but it will be readily understood that these parts can be formed separate and fixed to each other in any suitable manner. The wheel pieces and transoms are substantially hollow, or box-shaped in cross section, although these parts can be of any desired cross sectional shape.

Formed on or fixed to the undersides of the wheel pieces are pedestals 12 arranged in pairs in the usual manner and adapted to receive the usual journal boxes for the ends of the axles 13.

The center bolster of my improved truck is substantially H-shaped when viewed in plan, and is preferably cast in a single piece. The transversely disposed center member 14 of this bolster is substantially of inverted U-shape in cross section and practically straddles the center axle of the truck. Formed integral with the lower edges of the side walls or webs of this center member are outwardly projecting strengthening flanges 15, and formed integral with the upper and central portion of the member 14 is a horizontally disposed plate 16 which is adapted to receive a center bearing plate 17. A king pin opening 18 is formed through the central portions of the plates 16 and 17. The center bearing plate 17 is preferably made separate from the plate 16 in order that said center bearing plate can be removed when it has become unfit for service, although, if desired, said center bearing plate can be cast integral with the plate 16. Where the center bearing plate is made separate, the plate 16 is preferably provided on or near its edges with upstanding flanges 16ª which serve as bearings for the edges of the center bearing plate to take the shearing strains off the rivets or like devices utilized for fastening the center bearing plate to the bolster member.

The ends of the member 14 terminate inside or short of the wheel pieces 10, and formed integral with or fixed to the end portions of said member 14 are the brackets or extensions 19 which lie parallel with the wheel pieces 10, and the outer ends of these extensions or brackets occupy positions beneath the transoms 11.

Pivotally connected to the end portions of the extensions or brackets 19 are the lower ends of swing hangers 20, the same extending upward through suitable openings in the transoms 11, and the upper end of each swing hanger is preferably provided with two bearing points or points of pivotal connection with the transom.

Formed through the member 14 near its ends are horizontally disposed apertures 21 which are adapted to receive parts of the brake rigging, as shown by dotted lines in Fig. 1. Formed on or fixed to the ends of the member 14 are upwardly and outwardly projecting brackets 22, and the outer ends 23 of these brackets occupy positions above and adjacent to the tops of the wheels on the center axle of the truck. The top surfaces of the end portions 23 perform the functions of the truck bolster side bearings which coöperate with corresponding side bearings, or bearing members carried by the body bolster. (See dotted lines Fig. 3.)

If desired suitable side bearing plates or members may be detachably applied to the ends 23 of the extensions or brackets 22.

Suitable gusset plates and reinforcing flanges 24 are formed between the plate 16, extensions 19 and brackets 22.

In my improved truck it will be noted that the center bolster is located wholly within the truck frame and between the wheel pieces thereof, and that the upwardly and outwardly projecting end portions or brackets 22 of said center bolster are arranged adjacent to and above the tops of the wheels carried by the center axle. Thus the side bearings on the center bolster are comparatively close to each other, inasmuch as they are spaced apart a distance less than the space between the wheels or track rails, and for this reason the load carried by the bolster will, at all times, be distributed upon all of the wheels of the truck and there will be very little, if any, tendency of one side of the truck to raise by reason of a preponderance of weight upon the opposite side, as, for instance, where side bearings are arranged outside the wheel pieces of the truck and the weight of the tender bears down on one end of the center bolster, as is the case in rounding curves or by reason of a depression in one of the track rails.

A truck of my improved construction is comparatively simple, is composed of a minimum number of parts, and by extending the ends of the center bolster upward and outward over the center wheels truck side bearings, which are comparatively close to each other are provided, which arrangement is especially desirable in all trucks, and particularly those utilized beneath locomotive tenders.

It will be readily understood that minor changes in the size, form and construction of the various parts of my improved car truck can be made and substituted for those herein shown and described without departing from the spirit of my invention, the scope of which is set forth in the appended claims.

I claim:

1. In a six wheel truck for railway cars, a truck frame and a center bolster supported thereby, the end portions of which are extended upwardly and outwardly and terminate adjacent to and above the tops of the center wheels of the truck.

2. In a six wheel truck for railway cars, a truck frame and a center bolster supported thereby, the ends of which center bolster terminate inside the wheel pieces of the truck frame and above the tops of the center wheels of the truck.

3. In a six wheel truck for railway cars, a truck frame, a center bolster supported thereby, the ends of which center bolster terminate inside the wheel pieces of the truck frame, and are provided with side bearings, and a center bearing plate on the central portion of said bolster.

4. In a six wheel truck for railway cars, a truck frame, an H-shaped center bolster lying wholly within the lines of truck frame, and side bearings on said center bolster.

5. In a six wheel truck for railway cars, a truck frame, a center bolster supported thereby, the central portion of which bolster is substantially of inverted U-shape in cross section, and side bearings on said bolster inside the wheel pieces of the truck frame.

6. In a six wheel truck for railway cars, a truck frame, a center bolster supported thereby, side bearings on the bolster inside the wheel pieces of the truck, and a detachable center bearing on said center bolster.

7. In a six wheel truck for railway cars, a truck frame, a substantially H-shaped center bolster lying wholly within the lines of said frame, and supported thereby, the central member of which bolster straddles the central axle of the truck and the end portions of which center member are provided with side bearings.

8. In a six wheel car truck, a center bolster having its end portions extended upward and outward above the tops of the wheels of the center axle to form side bearings.

9. In a six wheel car truck, a center bolster having its end portions extended upward and outward above the tops of the wheels of the center axle to form side bearings, and a center bearing on said center bolster.

10. In a six wheel truck for railway cars, a truck frame, a substantially H-shaped center bolster, swing links from the truck frame to the ends of the legs of the center bolster, and side bearings on said bolster.

11. In a six wheel truck for railway cars, a truck frame, a substantially H-shaped center bolster, swing links from the truck frame to the ends of the legs of the center bolster, and side and center bearings on said bolster.

12. In a six wheel truck for railway cars, a truck frame, a substantially H-shaped center bolster, located wholly within the lines of the truck frame, the central member of which center bolster is arranged above the center axle of the truck, and side bearings on said center bolster.

13. In a six wheel truck for railway cars, a truck frame, a substantially H-shaped center bolster located wholly within the truck frame, the central member of which center bolster is arranged above the center axle of the truck, and side bearings and a center plate on said bolster.

14. In a six wheel truck for railway cars, a truck frame having bolsters, a center bolster arranged wholly within the truck frame, the end portions of which center bolster are extended upward and outward to form side bearings, and parts of which center bolster extend beneath the truck frame transoms, and hangers from the truck frame transoms to the extended parts of said center bolster.

15. A center bolster for six wheel trucks which is H-shaped, the cross-bar being extended beyond the legs of the H, and such extensions carrying side bearings.

In testimony whereof I hereunto affix my signature in the presence of two witnesses, this 18th day of April, 1913.

HARRY M. PFLAGER.

Witnesses:
CHARLES S. SHALLENBERGER,
HAL C. BELLVILLE.